US012631053B2

(12) United States Patent
Scholz et al.

(10) Patent No.: US 12,631,053 B2
(45) Date of Patent: May 19, 2026

(54) MOTOR VEHICLE LOCK, IN PARTICULAR MOTOR VEHICLE DOOR LOCK

(71) Applicant: KIEKERT AKTIENGESELLSCHAFT, Heiligenhaus (DE)

(72) Inventors: Michael Scholz, Essen (DE); Holger Schiffer, Meerbusch (DE); Ömer Inan, Dorsten (DE); Thomas Waldmann, Mülheim (DE); Peter Szegeny, Engelskirchen (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 71 days.

(21) Appl. No.: 18/689,230

(22) PCT Filed: Aug. 22, 2022

(86) PCT No.: PCT/DE2022/100629

§ 371 (c)(1),
(2) Date: Mar. 5, 2024

(87) PCT Pub. No.: WO2023/036368

PCT Pub. Date: Mar. 16, 2023

(65) Prior Publication Data

US 2025/0003267 A1 Jan. 2, 2025

(30) Foreign Application Priority Data

Sep. 10, 2021 (DE) ..................... 10 2021 123 441.7

(51) Int. Cl.

| | |
|---|---|
| ***E05B 85/26*** | (2014.01) |
| ***E05B 77/36*** | (2014.01) |
| ***E05B 77/40*** | (2014.01) |

(52) U.S. Cl.
CPC .............. *E05B 77/40* (2013.01); *E05B 77/36* (2013.01); *E05B 85/26* (2013.01)

(58) Field of Classification Search
CPC .......... E05B 77/36; E05B 77/38; E05B 77/40; E05B 85/20; E05B 85/24; E05B 85/243; E05B 85/26
See application file for complete search history.

(56) References Cited

U.S. PATENT DOCUMENTS 9,039,089 B2 * 5/2015 Ohba ..................... B60N 2/366 297/335
9,765,554 B2 * 9/2017 Cumbo .................. E05B 81/70
(Continued)

FOREIGN PATENT DOCUMENTS

| | | | |
|---|---|---|---|
| DE | 102019123837 | A1 | 4/2020 |
| WO | 2020083435 | A1 | 4/2020 |
| WO | 2021043368 | A1 | 3/2021 |

OTHER PUBLICATIONS

International Search Report mailed Nov. 2, 2022, for priority International Application No. PCT/DE2022/100629.

*Primary Examiner* — Kristina R Fulton
*Assistant Examiner* — Noah Horowitz
(74) *Attorney, Agent, or Firm* — Renner, Otto, Boisselle & Sklar, LLP.

(57) ABSTRACT

A motor vehicle lock, in particular a motor vehicle door lock, which is equipped with a locking mechanism consisting essentially of a rotary latch and a pawl as locking mechanism components. In addition, a latching element, which is mounted on the rotary latch and/or the pawl so as to be pivotable primarily in a locking mechanism plane, is provided in an engagement region between the two locking mechanism components. In order to axially secure the latching element, according to the invention, at least one locking mechanism component is equipped with a cover
(Continued)

which is made of the same material and at least partly extends over the latching element.

13 Claims, 2 Drawing Sheets

(56) References Cited

U.S. PATENT DOCUMENTS

| | | | | |
|---|---|---|---|---|
| 10,648,204 | B2 * | 5/2020 | Cumbo | E05B 77/36 |
| 10,865,589 | B2 * | 12/2020 | Pettengill | E05B 81/15 |
| 11,512,510 | B2 * | 11/2022 | Ottino | E05B 77/04 |
| 11,608,664 | B2 * | 3/2023 | Nishijima | E05B 81/64 |
| 11,674,341 | B2 * | 6/2023 | Ishiguro | E05B 81/42<br>292/194 |
| 2017/0051540 | A1 | 2/2017 | Okeke | |
| 2020/0208444 | A1 * | 7/2020 | Kajigai | E05B 85/243 |
| 2021/0156175 | A1 * | 5/2021 | Ishiguro | E05B 81/44 |
| 2021/0355722 | A1 * | 11/2021 | Inan | E05B 77/36 |
| 2022/0186534 | A1 * | 6/2022 | Wahmann | E05B 81/14 |

* cited by examiner

MOTOR VEHICLE LOCK, IN PARTICULAR MOTOR VEHICLE DOOR LOCK

This application is a national phase of International Patent Application No. PCT/DE2022/100629 filed Aug. 19, 2022, which claims priority to German Patent Application No. 10 2021 123 441.7 filed Sep. 10, 2021, which is hereby incorporated herein by reference in its entirety.

FIELD OF DISCLOSURE

The invention relates to a motor vehicle lock, particularly a motor vehicle door lock, with a locking mechanism consisting substantially of the rotary latch and the pawl, and with a latching element arranged in the engagement area between the two locking mechanism components, which is pivotally mounted on the rotary latch and/or the pawl for the most part in a locking mechanism level.

BACKGROUND OF DISCLOSURE

Vehicle locks and particularly vehicle door locks have been acoustically optimized for years in order to meet the increasingly stringent noise requirements. The focus is also on comfort improvements. The motor vehicle locks in question are, for example, motor vehicle door locks, which in principle can also be used on vehicle hoods, tailgates, fuel filler flaps, etc. This also includes vehicle locksmiths for seat locks, load locks, etc.

The engagement area between the rotary latch and the locking pawl as the two locking mechanism components has a decisive influence on both the acoustics and the feel of such motor vehicle locks and thus the comfort of operation. In principle, however, the engagement area can also be between two pawls in a multi-pawl locking mechanism. In this case, the engagement area refers to the area between a so-called comfort pawl and a pawl.

In the case of a motor vehicle lock and, in particular, a motor vehicle door lock of the design described at the beginning in accordance with WO 2020/083435 A1, the overall aim is to improve the guide of the latching element while taking into account a structurally simple and at the same time low-noise solution. For this purpose, the known teaching suggests that the latching element has a guide projection projecting from the locking mechanism level for additional axial and/or radial guidance. The guide extension can be designed in one piece with the latching element, for example as an embossing. It is also possible in this context to work with an additional element in the form of a separate push-through pin, for example, and/or to form this as part of a wrapping of the latching element.

Furthermore, in practice, the plastic sheathing already provided on a rotary latch, for example, is often used to guide and secure the latching element axially. In other words, in this case the plastic sheathing is extended into the area of the bearing of the latching element in the example case on the rotary latch and covers the area of the bearing. As a result, the latching element is axially secured with the aid of the plastic sheathing, meaning that the bearing axis of the latching element cannot move axially.

However, situations do occur in practice in which axial movements of the bearing axis of the latching element are observed due to the sheathing despite the axial securing that has been implemented. In this context, the sheathing may even shear off or break because it is produced from plastic. The invention as a whole seeks to remedy this.

SUMMARY OF DISCLOSURE

The invention is based on the technical problem of further developing a motor vehicle lock in such a manner, and in particular a motor vehicle door lock, so that the latching element has perfect axial securing.

In order to solve this technical problem, the invention proposes in a motor vehicle lock of the same type, and in particular a motor vehicle door lock, that at least one locking mechanism component is equipped with a cover of the same material that at least partially overlaps the latching element in order to axially secure the latching element.

As already explained in the introduction, the latching element can in principle be pivotably mounted on the rotary latch as well as on the pawl or on both locking mechanism components, namely in relation to pivoting movements in the locking mechanism level. The locking mechanism level is spanned by the rotary latch and the at least one pawl. In principle, the engagement area can also be present between two pawls in a multi-pawl locking mechanism, as already explained.

As a rule, however, the engagement area is provided on the rotary latch and the latching element is pivotably mounted on the rotary latch as the relevant locking mechanism component. In order to equip a bearing axis of the latching element defined in the course of the pivotable bearing with the desired axial securing, the invention proposes the material-like cover on the locking mechanism component in question, which at least partially overlaps the latching element. It is particularly important that the cover reaches and covers the engagement area of the latching element in the locking mechanism component in question and thus ensures and can also ensure the desired axial securing of the position axis.

According to the invention, the cover is a cover of the same material as the locking mechanism component, i.e. the cover and the locking mechanism component are made of the same material. Steel is typically used for the locking mechanism component. Accordingly, the cover of the same material is also made of steel, so that the axial securing of the bearing axis of the latching element is significantly improved compared to the plastic sheathing used in practice and in the prior art.

The identical material design of the cover compared to the associated locking mechanism component does not, of course, rule out the possibility that different types of steel may be used for the locking mechanism component and the cover. This is because the locking mechanism component in question is usually designed as a multi-layer with at least one core layer and a cover layer having the cover. The core layer and the cover layer can each be made of steel. Nevertheless, it is possible to use a particularly tough steel for the core layer compared to the cover layer. This means that the term "same material" is to be interpreted broadly in the context of the invention.

It is also sufficient if the core layer in question and the cover layer are each made of one metal. For example, it is conceivable that the core layer could be made of steel, while the cover could be made of another metal such as copper or brass. Of course, different metal alloys for the core layer on the one hand and the cover layer on the other are also conceivable in this context and are comprised by the invention.

In contrast, a cover of the same material and a corresponding cover layer, for example made of plastic, are excluded according to the invention. As a result, the cover and consequently also the cover layer have material properties comparable to those of the core layer, particularly with regard to strength and toughness, which must be able to withstand the tensile forces that occur, for example, to meet safety requirements or in the event of a crash. As a result, the latching element is perfectly secured axially and, in contrast to the prior art, there is (no longer) any risk of the cover layer or the cover being sheared off, torn off or otherwise damaged. These are the main advantages.

The possibility of equipping the locking mechanism component with at least one core layer and a cover layer having the cover can be further developed in such a manner that the at least one core layer is provided between cover layers on both sides. In addition to such a three-layer structure, further layers in the sense of a multi-layer structure of the locking mechanism component in question are of course also conceivable and are comprised by the invention. In all these cases, the invention also proceeds in such a manner that the cover layer exceeds the core layer in terms of area by the amount of the cover. In this context, the cover ensures that the engagement area between the locking mechanism component in question and the latching element is covered, thereby providing the designed bearing axis with the desired axial securing.

In addition to the previously described possibility of producing the cover layer and the core layer from the same or different metals, the invention also allows the cover layer and the core layer to have the same or different material thicknesses. This also allows the different strength requirements to be met with particular precision.

There is also the further option of coupling the cover layer and the core layer to one another using external connecting means. These external connecting means can be rivets or screws that penetrate the respective layers, for example. Furthermore, within the scope of the invention, it is possible to connect the individual layers to one another by means of a sheathing made of plastic, for example.

In principle, the measures described above can of course also be combined with one another.

In a particularly preferred variant, the cover layer and the core layer are connected or coupled to one another by a forming process without additional material. This means that the individual layers are deformed together or subjected to the forming process described above in order to couple them to one another without additional material. This can be a so-called through-joining or clinching. In this case, the individual layers are coupled to one another by forming, for example by means of punctual clinching indentations.

In principle, there is also the further possibility of coupling the cover layer and the core layer with one another by means of a joining process and particularly a heat joining process without forming. This can be done, for example, by welding the individual layers together at least at certain points. Laser welding or spot welding are generally available for this purpose.

As previously explained, the latching element is usually mounted on the rotary latch in such a manner that it can rotate, defining the layer. This is usually done in such a manner that the latching element engages with a bearing tooth in an associated joint recess of the rotary latch.

As a result, a motor vehicle lock and particularly a motor vehicle door lock is made available which, first of all, provides particularly quiet operation with increased convenience due to the latching element realized. This is because, in contrast to conventional locking mechanisms, there is no (longer) metal-to-metal friction between the two locking mechanism components; instead, the interposed latching element, which is pivot-mounted at the locking mechanism level, ensures that the interaction is more or less "rolling", so that the background noise is reduced and less force is required, thereby improving comfort. All this is paired with a perfect radial and axial guide of the latching element according to the invention, so that the kinematics are improved once again overall. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
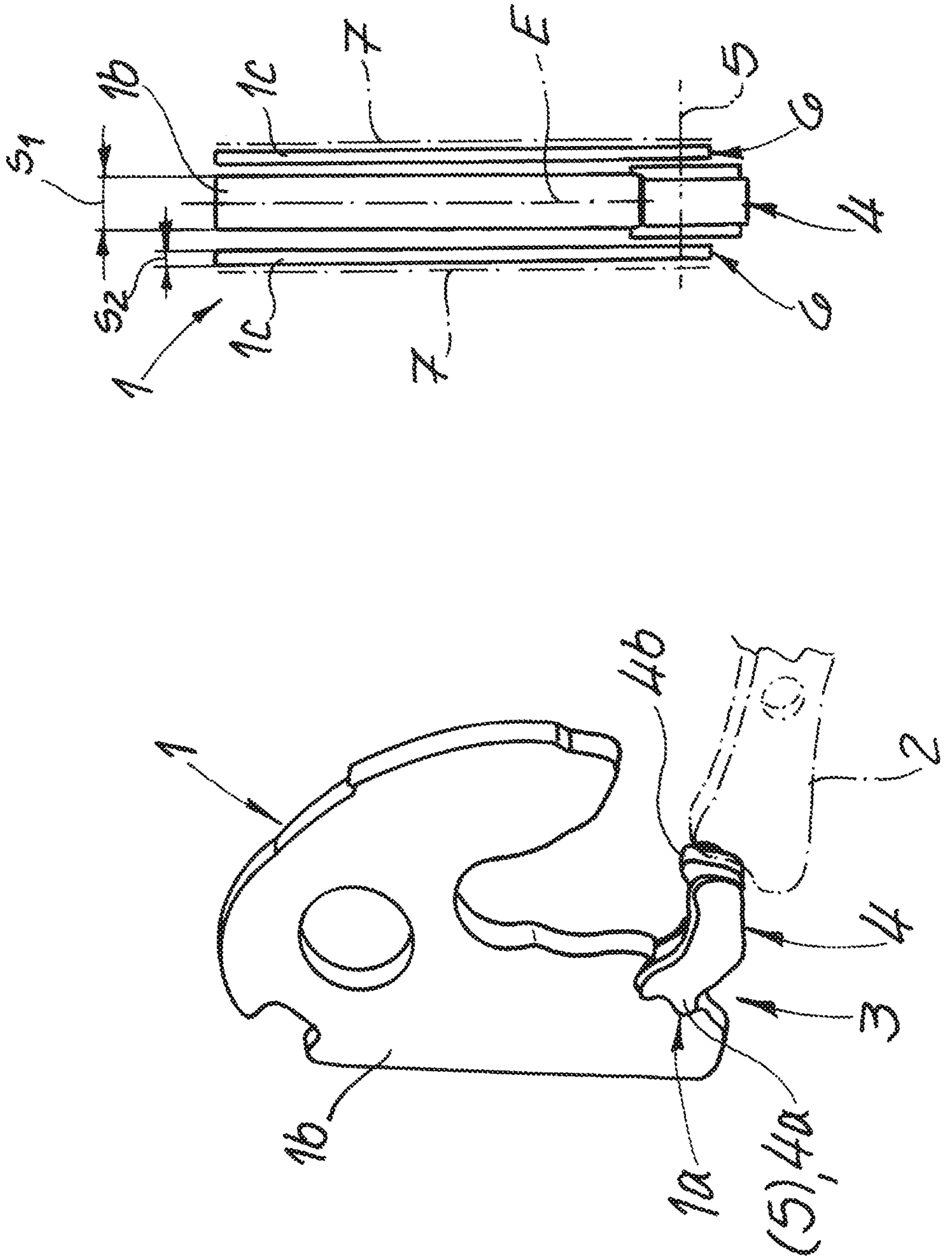
FIG. 1 shows a partial schematic side view of the motor vehicle lock according to the invention, particularly the motor vehicle door lock.

In the drawings, a motor vehicle lock is shown, which is not limited to a motor vehicle door lock. In its basic design, this has a locking mechanism 1, 2 consisting of the two substantially locking mechanism components, namely rotary latch 1 and pawls 2. In principle, however, the locking mechanism 1, 2 can also be equipped with more than one pawl 2, although this is not represented in detail.

The other basic structure includes a latching element 4 arranged in the engagement area 3 between the two locking mechanism components 1, 2. According to the exemplary embodiment, the latching element 4 is rotatably mounted on the rotary latch 1 and can perform pivoting movements in a locking mechanism level E spanned by the locking mechanism 1, 2. In fact, in the exemplary embodiment, the design is such that the latching element 4 is rotatably mounted on the rotary latch 1 and has a bearing tooth 4*a* for this purpose. The bearing tooth 4*a* on the latching element 4 is located at one end of the latching element 4, opposite the other end of the latching element 4, which interacts with the pawl 2 according to the exemplary embodiment. For this purpose, this opposite end of the latching element 4 is equipped with a reinforcement 4*b*.

The bearing tooth 4*a* engages as a whole in a joint recess 1*a* of the rotary latch 1 in the engagement area 3. In this manner, a bearing axis 5 is defined about which the latching element 4 is pivotably mounted in the locking mechanism level E, namely relative to the rotary latch 1 bearing the latching element 4.

Figure 2:
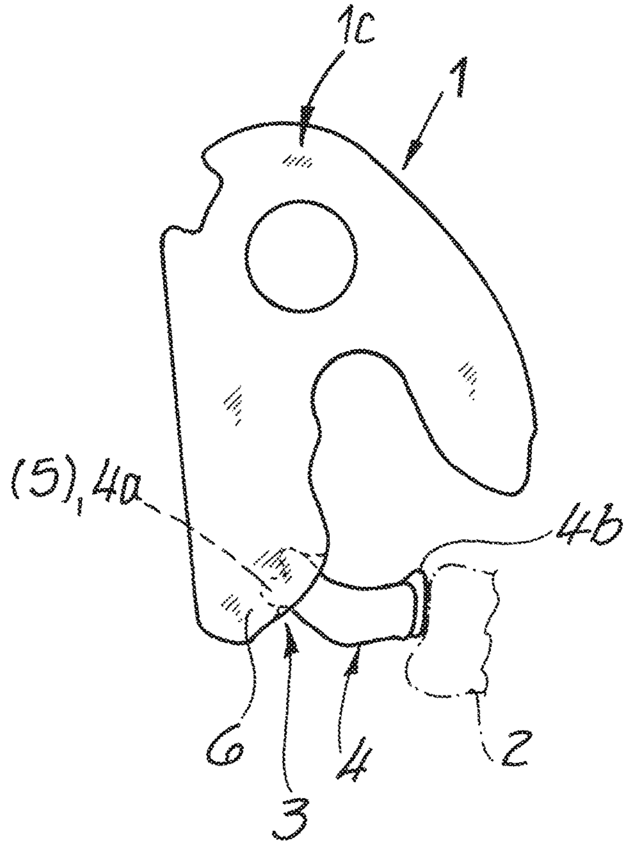
FIG. 2 shows a further view of the motor vehicle lock or motor vehicle door lock according to the invention.

In accordance with the invention, the relevant locking mechanism component 1, 2 supporting the latching element 4, in the exemplary embodiment the rotary latch 1, is now equipped with a material-like cover 6 at least partially overlapping the latching element 4 for axially securing the latching element 4, which can be understood particularly by comparing FIGS. 1 and 2. According to the exemplary embodiment, the rotary latch 1 is equipped with a multi-layer with a core layer 1*b* and a cover layer 1*c* having the cover 6. It can be seen that, according to the exemplary embodiment, the core layer 1*b* is provided and realized between two cover layers 1*c* on both sides. The cover layers 1*c* on both sides are each equipped with the cover 6, so that the bearing axis 5, which in the side view extends between the two covers 6, is axially secured in this manner. The same applies to the latching element 4.

The design is such that the cover layer 1*c* overlaps the core layer 1*b* by the amount of the cover 6. In fact, the cover

6 is designed and configured in such a manner that it at least covers the engagement area 3 between the relevant locking mechanism component 1, 2, in the exemplary embodiment the rotary latch 1, and the latching element 4, in order to be able to provide in this manner for the axial securing of the bearing axis 5 and thus of the latching element 4. In other words, according to the exemplary embodiment, the two cover layers 1*c* on both sides of the core layer 1*b* with the respective covers 6 provided thereby ensure that the latching element 4 is thereby secured axially and consequently cannot perform any axial movements along the bearing axis 5. Rather, any movement of the latching element 4 relative to the rotary latch 1 is ultimately and solely reduced to the locking mechanism level E, within which the latching element 4 can pivot relative to the rotary latch 1.

The cover layer 1*c* or the respective cover layer 1*c* and the core layer 1*b* are generally produced from the same or different metals. For example, a particularly tough steel can be used for the core layer 1*b* in order to be able to control the tensile forces that the core layer 1*b* usually has to absorb on the locking mechanism 1, 2. In contrast, the cover layer 1*c* can be produced from a steel that is not as tough as the core layer 1*b*. In principle, a metal other than steel is also conceivable for the realization of the cover layer 1*c* in this context.

In addition, the side view shows that the cover layer 1*c* and the core layer 1*b* have the same or different material thicknesses $s_1$, $s_2$. In most cases, the design is such that the core layer 1*b* has a material thickness $s_1$ many times greater than the material thickness of the cover layer. For example, thickness ratios of 2:1 and more are observed at this point.

This means that the material thickness $s_1$ of the core layer 1*b* is generally at least twice as thick as the material thickness $s_2$ of the respective cover layer 1*c*. In most cases, ratios $$s_1:s_2 \geq 2:1$$

are even observed.

In order to connect the individual layers 1*b*, 1*c* of the rotary latch 1 to one another, external connecting means can generally be used. Here it is conceivable, for example, to work with rivets or screws that reach through the individual layers 1*b*, 1*c* together and thereby couple them. A connection of the individual layers 1*b*, 1*c* is also possible by means of a plastic sheathing 7, which is only indicated in the figures. In addition, the individual layers 1*b*, 1*c* can also be connected to one another by a forming process without filler material or a heat joining process.

In this location, the so-called through-joining or clinching process has proven to be particularly favorable as a suitable forming process without filler material. In this case, the relevant layers 1*b*, 1*c* are each point-clinched together by joining or clinching the layers 1*b*, 1*c* together using point-acting plungers. Alternatively or additionally, the layers 1*b*, 1*c* can also be firmly connected to each other by means of a heat joining process. In such a heat joining process, the layers 1*b*, 1*c* are simply welded together. This can be done in detail using a spot welding process or a laser welding process.

REFERENCE SIGNS

Locking mechanism 1, 2
Rotary latch 1
Joint recess 1*a*
Core layer 1*b*
Cover layer 1*c*
Pawl 2
Engagement area 3
Latching element 4
Bearing tooth 4*a*
Reinforcement 4*b*
Bearing axis 5
Cover 6
Sheathing 7
Locking mechanism level E
Material thickness $s_1$, $s_2$

The invention claimed is:

1. A motor vehicle lock comprising:

a locking mechanism including locking mechanism components comprising a rotary latch and a pawl, and a latching element which is arranged in an engagement area between the locking mechanism components and which is pivotally mounted on the rotary latch or the pawl at least in part in a plane of the locking mechanism, wherein for axially securing the latching element, at least one of the locking mechanism components is equipped with a cover of a first material, and the cover at least partially overlaps the latching element, wherein the at least one of the locking mechanism components that is equipped with the cover is multi-layer with a core layer provided between cover layers on both sides of the core layer that comprise the cover, wherein the cover layers extend beyond the core layer to overlap the latching element such that a bearing axis of the latching element extends between the cover layers such that a portion of the latching element is provided between the cover layers on both sides of the portion of the latching element.

2. The motor vehicle lock according to claim 1, wherein the cover layers and the core layer are produced from the first material.

3. The motor vehicle lock according to claim 1, wherein the cover layers and the core layer have a same material thickness.

4. The motor vehicle lock according to claim 1, wherein the cover layers and the core layer are coupled to one another by an external connector.

5. The motor vehicle lock according to claim 1, wherein the cover layers and the core layer are connected to one another by a forming process without filler material, or by a joining process.

6. The motor vehicle lock according to claim 1, wherein the latching element is rotatably mounted on the rotary latch.

7. The motor vehicle lock according to claim 6, wherein the latching element has a bearing tooth that engages with the rotary latch in a joint recess of the rotary latch.

8. The motor vehicle lock according to claim 7, wherein the latching element has a reinforcement element positioned on an end of the latching element opposite from the bearing tooth, and the reinforcement element engages with the pawl.

9. The motor vehicle lock according to claim 1, wherein the cover layers and the core layer are produced from different material, with a material of the core layer being tougher than the first material of the cover layers.

10. The motor vehicle lock according to claim 9, wherein the core layer and the cover layers are made of different types of steel, or made of different metals.

11. The motor vehicle lock according to claim 1, wherein the cover layers and the core layer have a different material thickness, with the core layer being thicker than the cover layers.

12. The motor vehicle lock according to claim 4, wherein the external connector includes at least one of rivets, screws, or a sheathing.

13. The motor vehicle lock according to claim 2, wherein the first material is steel.

* * * * *